INVENTORS
George R. Squibb &
BY Donald A. Urquhart
L. D. Burch
ATTORNEY

United States Patent Office 2,803,509
Patented Aug. 20, 1957

2,803,509

PROCESS AND APPARATUS FOR GRINDING PISTON RINGS AND PRODUCT THEREOF

George R. Squibb, Birmingham, Mich., and Donald A. Urquhart, Newark, Del., assignors to General Motors Corporation, Detroit, Mich., a corporation of Delaware Application December 9, 1953, Serial No. 397,142

14 Claims. (Cl. 309—44)

The present invention relates to a process and apparatus for producing resilient packing rings and product thereof.

In the manufacture of split resilient packing rings such as are used for piston rings, it is necessary that the peripheral surface of the ring be formed as round as possible to insure that a good sealing engagement be provided between the piston ring and the cylindrical surface it engages.

Accordingly, it is proposed to provide a simple process and apparatus for carrying out certain steps in the process for forming split, resilient packing rings whereby the external peripheral surface of the rings resiliently engage the internal wall of a cylinder in uniform sealing engagement and whereby the side surfaces of the rings uniformly engage the walls of grooves in a piston movable in a cylinder.

The steps in the process and the apparatus for performing certain of the steps in the process by which this object may be accomplished together with certain other novel features of the invention will become apparent by reference to the following detailed description of the process and drawings illustrating apparatus for carrying out steps in this process.

Referring to the drawings in more detail the present invention may be embodied in a grinding machine 10. The grinding machine 10 may be mounted on a substantially horizontal base 12 which is supported on a suitable standard 14. The machine includes a grinding unit 16 and a work holding unit 18.

The grinding unit 16 is secured to the base 12 and has a housing 20 that encloses motor means for driving a vertical grinding wheel 22 that is adapted to rotate on a horizontally disposed shaft 24 that projects from the side of the housing 20. Adjusting means such as the hand crank 28 may be provided for moving grinding unit 16 along a line parallel to the grinding wheel 22 so as to compensate for any wearing of the wheel 22.

The work holding unit 18 which has the bottom thereof secured to the base 12 includes a substantially vertical magazine 30, a substantially vertical passage 32 and a feed mechanism 34 for transferring unground piston rings 36 from the bottom of the magazine 30 to the upper end of a vertical stack 38 of piston rings in passage 32 and continuously moving said rings through the passage 32 at a substantially uniform velocity.

The magazine 30 includes a plurality of vertical members 40, 42, 44 and 46 that project upwardly from the top of the work unit 18 with the lower ends thereof disposed adjacent the upper end of the passage 32. These members 40, 42, 44 and 46 are spaced to permit the unground rings 36 in their normal or expanded size to fit loosely therein so that they may descend freely through the magazine 30 as a result of gravity only. In order to properly align and position the rings, it may be desirable that one of the members 40 be provided with a rib 48 that extends the length thereof and projects inwardly toward the center of the magazine 30. This rib 48 is preferably approximately the equal to or slightly smaller than the width of the gap 50 formed in the expanded piston ring 36. Thus when the rings 36 are in the magazine 30, they will form a drum with all of the gaps 50 in substantial alignment.

Figure 1:
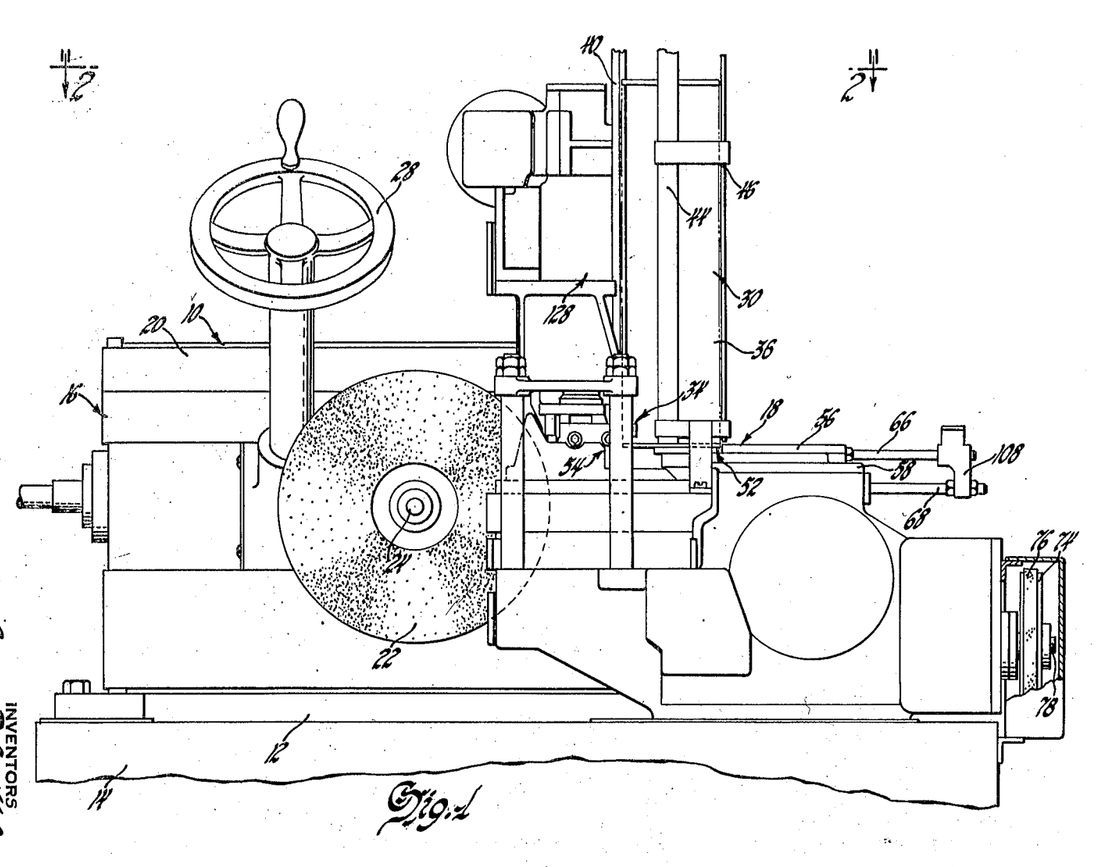
Fig. 1 of the drawings is a side elevational view of an apparatus that embodies the present invention and is adapted for grinding piston rings.
Figure 2:
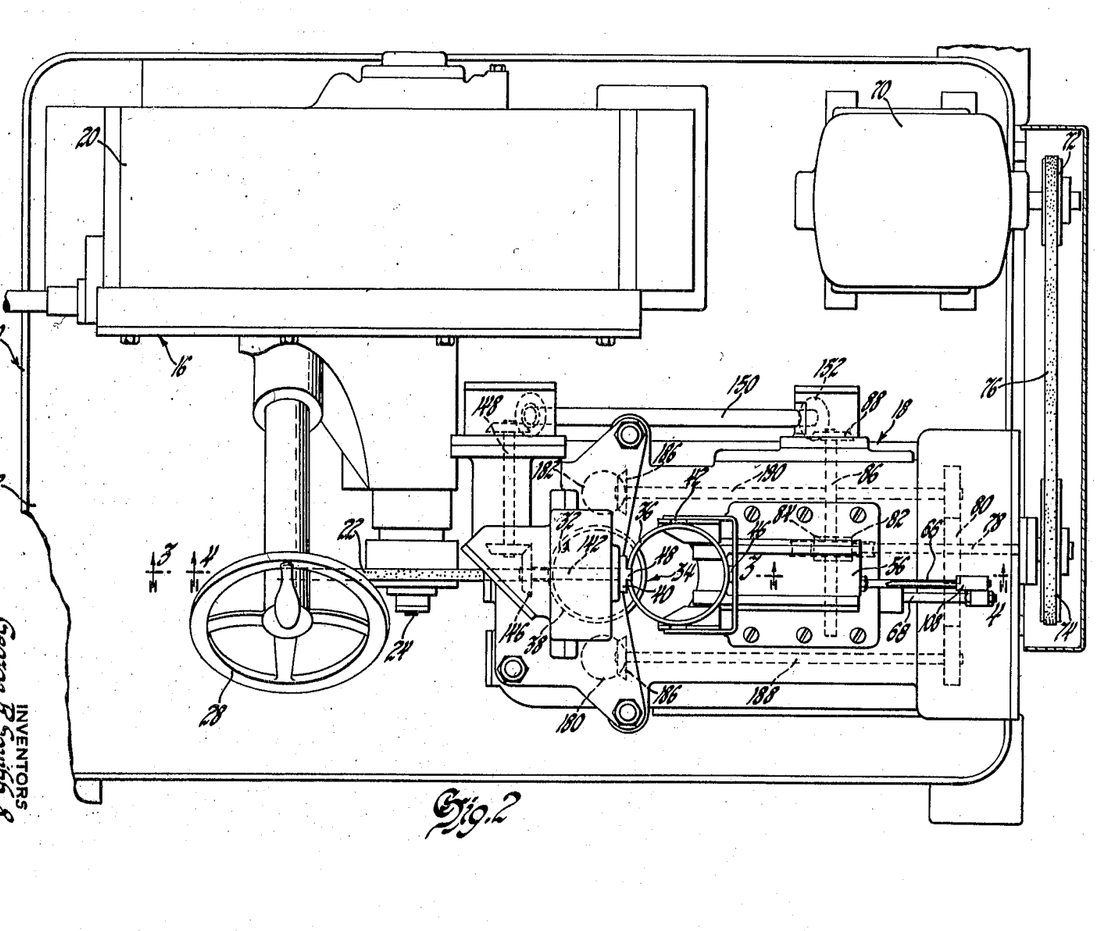
Fig. 2 is a plan view of the apparatus of Fig. 1 taken substantially along the plane of line 2—2 in Fig. 1.
Figure 3:
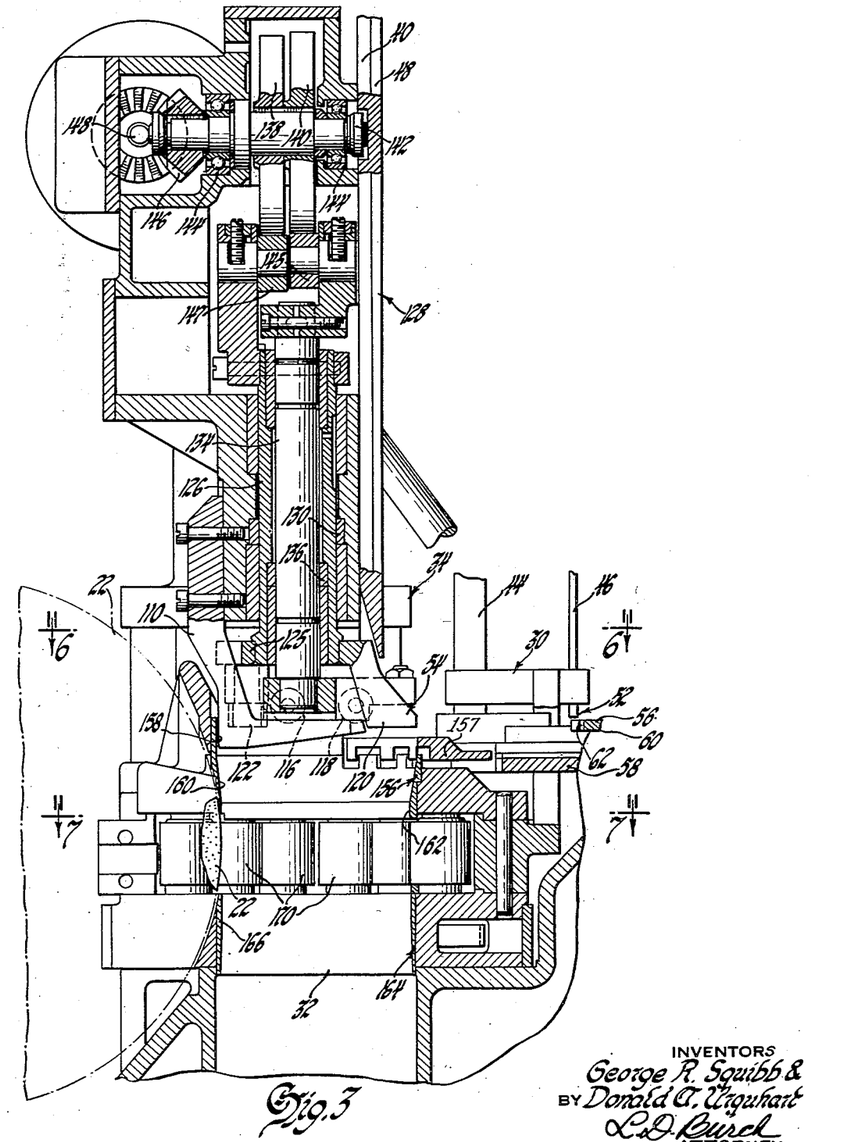
Fig. 3 is a vertical cross sectional view taken substantially along the plane of line 3—3 in Fig. 2 and showing a portion of the feed mechanism.
Figure 4:
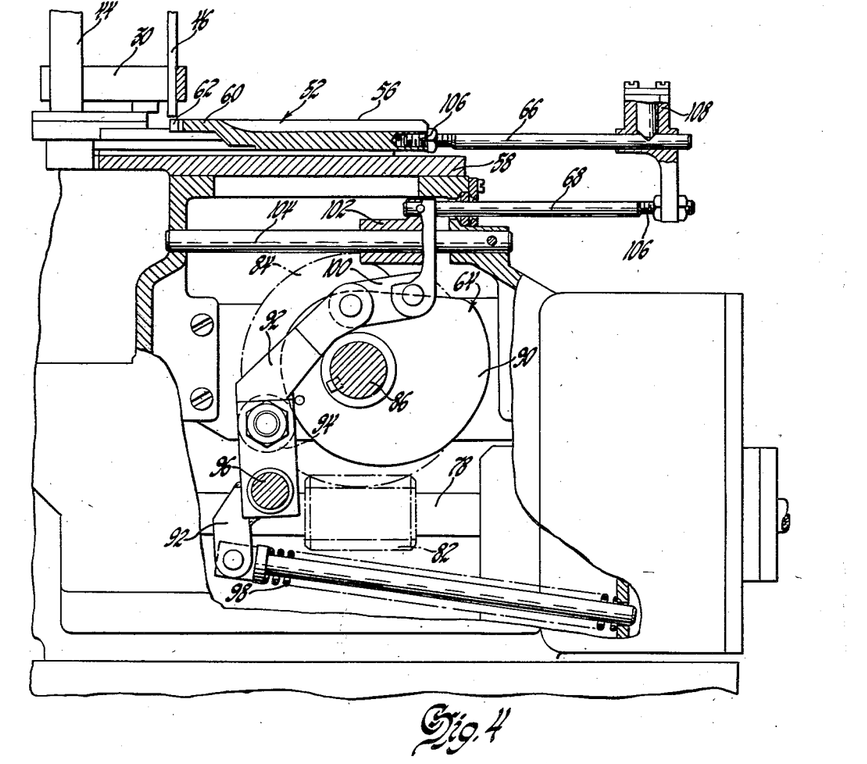
Fig. 4 is a vertical cross sectional view taken substantially along the plane of line 4—4 in Fig. 2 and showing a portion of the feed mechanism.
Figure 5:
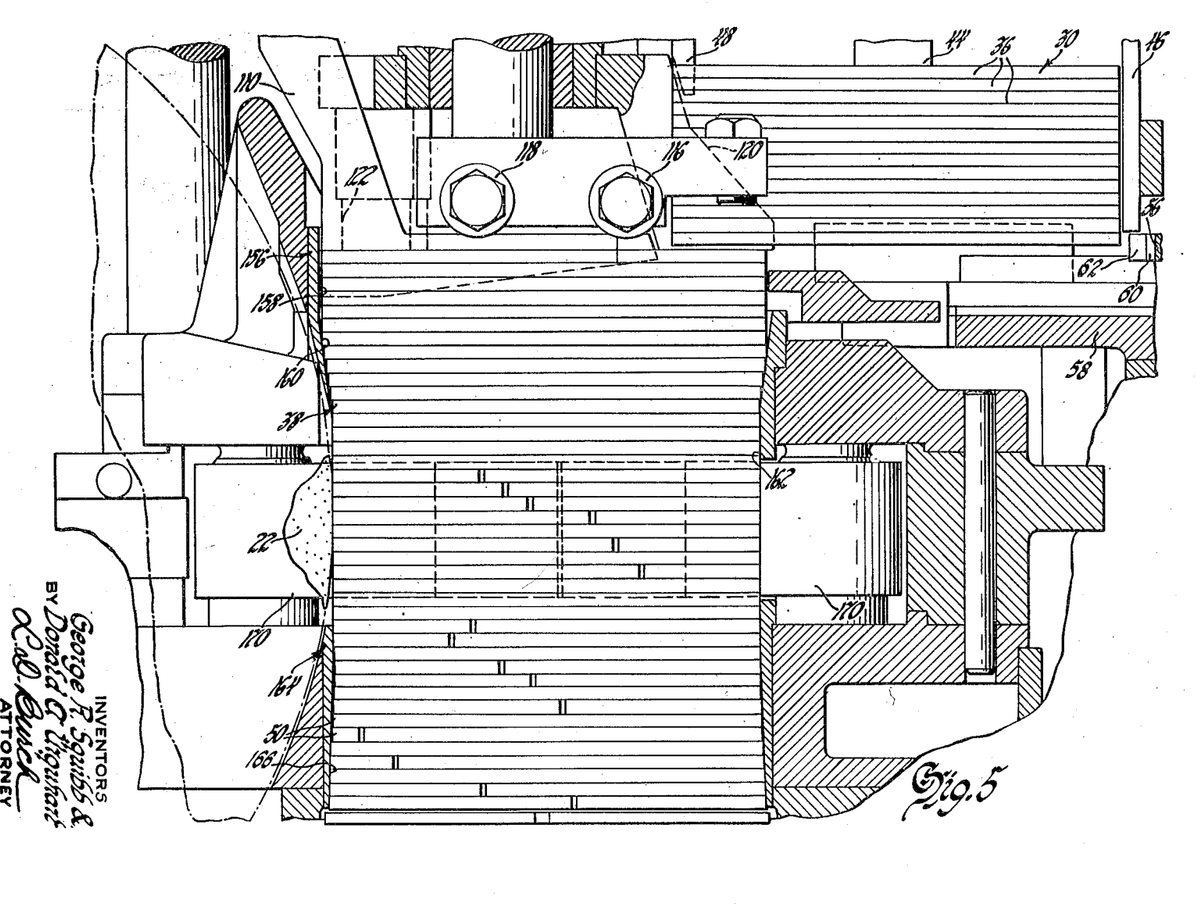
Fig. 5 is a vertical cross sectional view on an enlarged scale of a portion of Fig. 3.

The feed mechanism 34 (see Figs. 1, 2, 3, 4 and 5) includes two portions, a horizontal or cross feed 52 and a vertical feed 54. The horizontal or cross feed 52 is mounted on the top of the work holding unit 18 for transferring one unground ring 36 at a time from the bottom of the magazine 30 horizontally into the vertical feed 54. The horizontal feed 52 includes a member 56 which is slidably mounted on a platform 58 on top of the work holding unit 18 for reciprocating movement toward and away from the magazine 30. This member 56 has a raised end 60 with an arcuate recess 62 with approximately the same shape as the expanded rings 36. Although the end 60 of this member 56 may be of any desired thickness, in the present instance it is approximately the same thickness as one ring and it is positioned to engage the bottom ring in the magazine 30. In order to provide this member 56 with reciprocating motion, a drive mechanism 64 may be located below the platform 58 and be connected to the member 56 by a pair of parallel rods 66 and 68. The drive mechanism 64 includes a motor 70 having a pulley 72 on one end that is drivingly connected to another pulley 74 by an endless belt 76. The pulley 74 is mounted on a horizontal shaft 78 that extends longitudinally of the work holding unit 18 and has a gear 80 in the center thereof and a worm 82 on the end. This worm 82 engages a worm wheel 84 that is mounted to rotate with a shaft 86 disposed in a plane at right angles to the shaft 78. This shaft 86 extends transversely of the work holding unit 18 and has a beveled gear 88 on one end and a contoured cam 90 on the other end. A link 92 having a roller 94 mounted thereon for engaging the contoured surface of the cam 90 may be pivotally mounted on a pin 96. Thus as the shaft 86 rotates, the cam 90 will cause the link 92 to rotate counterclockwise (Fig. 4) about said pin 96. An expansion spring 98 may be disposed diagonally below the cam 90 so as to be secured to said link 92. This spring 98 will bias the link 92 clockwise and retain the roller 94 against said cam surface 90 at all times. An articulated link 100 may be employed for connecting the upper end of link 92 to a bushing 102 slidably disposed on a guide 104 positioned under the platform 58. The bushing 102 is in turn connected to the member 56 by the parallel rods 66 and 68 extending around the end of the platform 58. The rods 66 and 68 may have threaded means 106 in addition to the fitting 108 for adjusting the position of the member 56. Thus as the shaft 78 rotates with the pulley 74 which is driven by the motor 70, the worm 82 and worm gear 84 will cause the shaft 86 to rotate. The rotation of this shaft 86 will be transformed into reciprocating movement of the member 56 by means of the cam 90 and links 92 and 100. Thus as the motor 70 drives the member 56 toward the magazine 30 the forked or raised end 60 of member 56 will engage the ring in the bottom of the magazine 30 and cause it to slide into the vertical feed 54.

The vertical feed 54 is adapted to simultaneously receive the ring transferred from the cross feed 52 and continuously move the individual rings in the stack 38 downwardly through the passage 32 at a substantially uniform velocity. In order to assist in positioning the rings an arm 110 may project across the top of the passage 32 so that the gap 50 in the transferred ring will straddle the arm 110. Thus when the rings are in position on the top of the stack 38, the gaps 50 will be in alignment.

Figure 6:
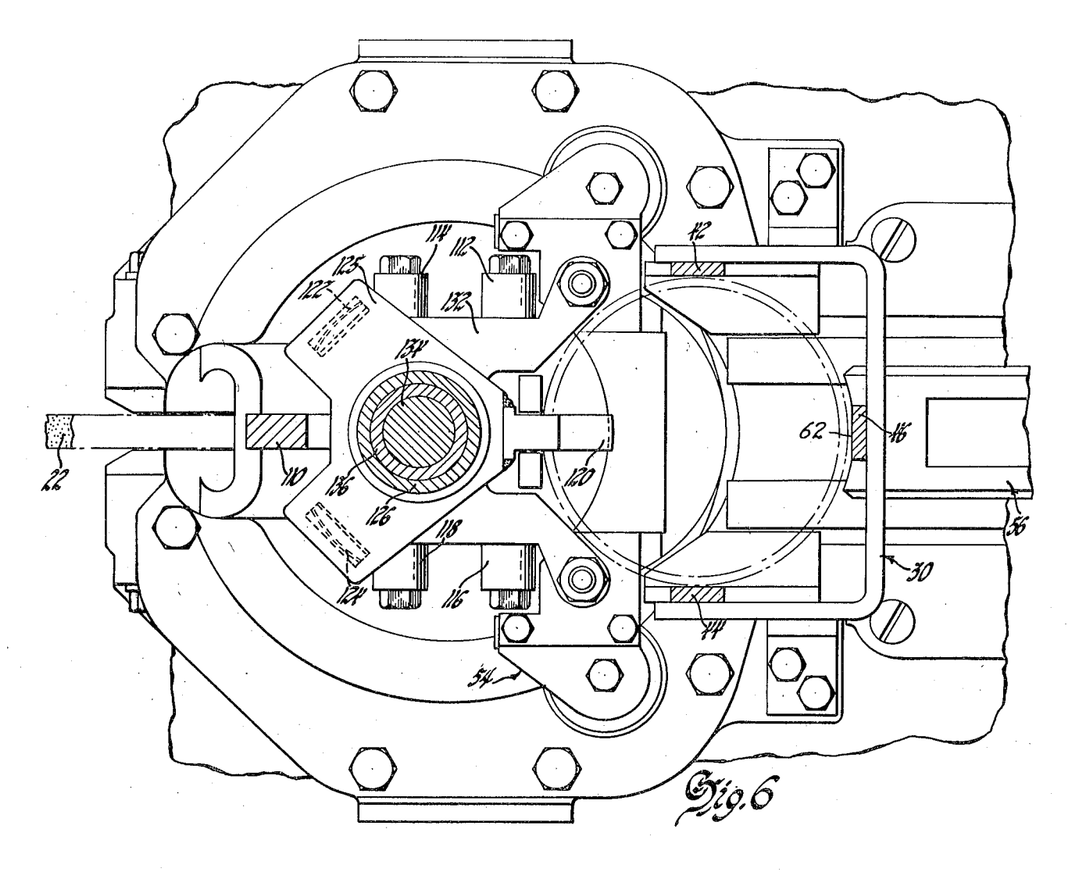
Fig. 6 is a horizontal cross sectional view taken substantially along the plane of line 6—6 in Fig. 3.
Figure 7:
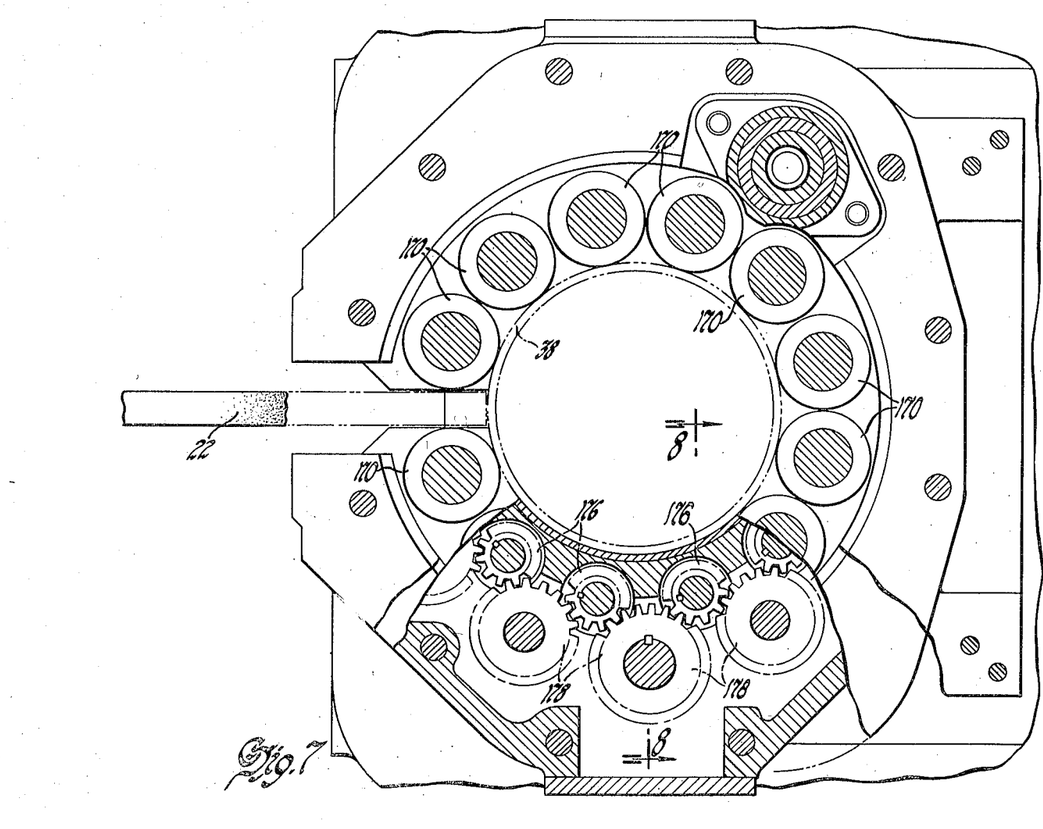
Fig. 7 is a horizontal cross sectional view taken substantially along the plane of line 7—7 in Fig. 3.
Figure 8:
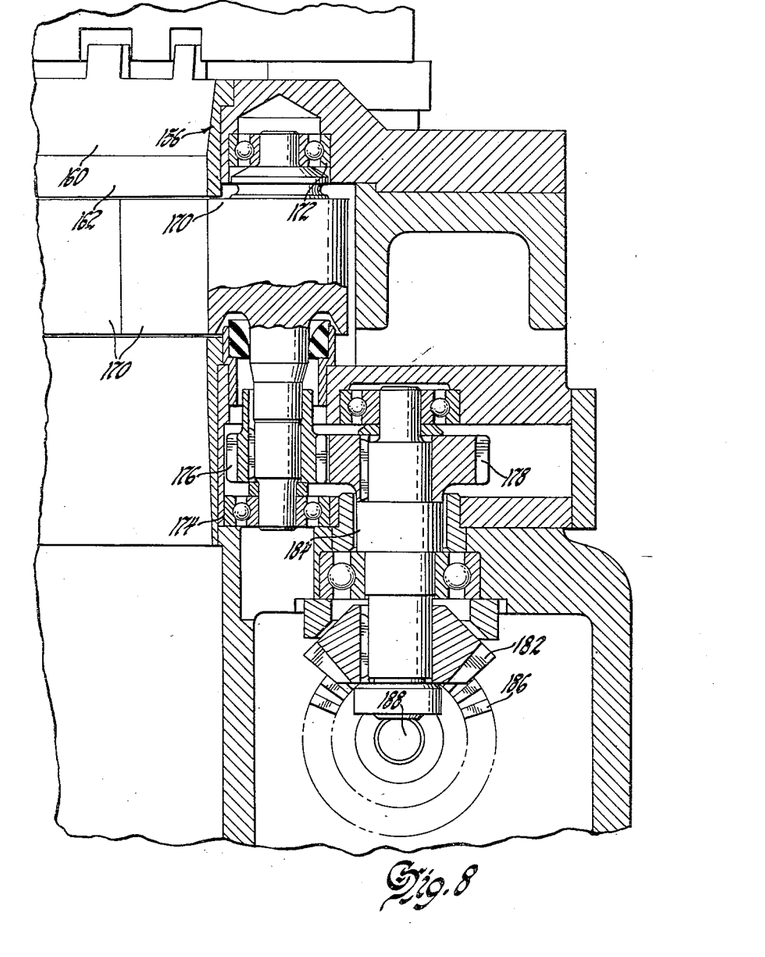
Fig. 8 is a cross sectional view taken substantially along the planes indicated by line 8—8 in Fig. 7.
Figure 9:
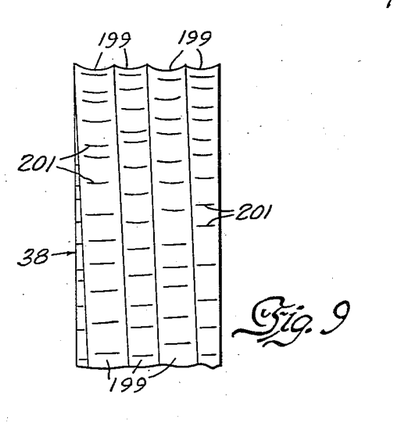
Fig. 9 is a fragmentary side view of a finished ring ground by the apparatus in Figure 1.

The vertical feed 54 may include a group of rollers 112, 114, 116 and 118 and a group of fingers 120, 122 and 124 that are positioned to engage the ring on the upper end of the stack 38. See Figures 3, 5 and 6. In the present instance three fingers 120, 122 and 124 are positioned to engage the ring on the upper end of the stack 38 on the portion closest to the cross feed 52 and the portion farthest from the cross feed 52. The fingers 120, 122 and 124 mounted on a collar 125 are secured to the lower end of a tubular member 126 that extends up into the column 128 substantially coaxial with the passage 32. The tubular member 126 is positioned in bushing 130 to permit reciprocating motion of the tubular member 126 axially on the column 128. The rollers 112, 114, 116 and 118 are mounted on the sides of a platform 132 so as to be positioned between the fingers 120, 122 and 124 and engage the uppermost ring in the stack 38 along the intermediate portions thereof. The platform 132 is mounted on the lower end of a rod 134 which is slidably disposed in bushings 136 on the inside of the tube 126. In order to cause reciprocating movement of the fingers 120, 122 and 124 and rollers 112, 114, 116 and 118, a pair of cams 138 and 140 may be keyed to a shaft 142 rotatably mounted on ball bearings 144 in the upper end of said column 128. The peripheral surface of these cams 138 and 140 engage rollers 145 and 147 on the upper end of the rod 134 and tube 126 so that turning of the shaft 142 will result in the fingers 120, 122 and 124 and rollers 112, 114, 116 and 118 being forced down by the cams 138 and 140. The shaft 142 has a beveled gear 146 on one end that is driven from a horizontal shaft 148 on the upper end of the column 128. This shaft 148 is in turn driven by a diagonal shaft 150 that has a bevel gear 152 meshing with the gear 88 on the end of the transverse shaft 86. Thus the reciprocating member 56 and the fingers 120, 122 and 124 and rollers 112, 114, 116 and 118 are driven from a common source and their movement is coordinated by their respective gear trains.

In operation of the grinding apparatus 10 during its advancing stroke the reciprocating member 56 in the cross feed 52 will slide a transfer ring from the bottom of the magazine 30 toward the top of the passage 32. The cam 138 is profiled so that at the beginning of this stroke the fingers 120, 122 and 124 will be in an elevated position. The cam 140 is profiled so that the rollers 112, 114, 116 and 118 will be descending at a uniform velocity and forcing the rings in the stack 38 through the passage 32 at said velocity. When the transfer ring has passed under the finger 120 the cam 138 will cause the fingers 120, 122 and 124 to engage the end of the stack 38. The cam 138 is profiled to cause the fingers to move downwardly at the same velocity as said rollers 112, 114, 116 and 118. As soon as this occurs the profile of cam 140 will cause the rollers 112, 114, 116 and 118 to disengage the end of the stack 38 and permit the transfer ring to pass thereunder as said member 56 continues to advance. As the member 56 approaches the end of its stroke and before the transfer ring engages the fingers 120, 122 and 124, the cam 140 will lower the rollers 112, 114, 116 and 118 against the transfer ring and urge the stack 38 down at the same velocity. After the rollers 112, 114, 116 and 118 engage the transfer ring, the fingers 120, 122 and 124 will be raised. Since only the rollers are depressing the transfer ring and are free to rotate during movement of the ring, the member 56 may complete moving the transfer ring onto the top of the stack 38. After the advancing stroke is completed the cam 90 and spring 98 will cause the member 56 to rapidly return to its starting position and repeat its advancing stroke.

From the foregoing it is apparent that either the fingers 120, 122 and 124 or rollers 112, 114, 116 and 118 are always in engagement with the uppermost ring and forcing the stack 38 continuously downwardly through the passage 32 at a substantially uniform velocity at all times. In addition since the stack 38 is being engaged at spaced points there is no tendency to tip the stack and cause the rings to become askew in the passage 32. The rollers 112, 114, 116 and 118 will permit forcing the ring into position if they are still engaging the rings when they are to be moved. Since the fingers 120, 122 and 124 will clear the rings when there is lateral movement of the rings, they will not need rollers, but, if desired, they could have rollers.

The passage 32 extends vertically downwardly through said work holding unit 18. The upper end of the passage 32 has a hollow member 156 with a short cylindrical portion 158, a radially inwardly tapered portion 160 and a short cylindrical portion 162 of reduced diameter. The cylindrical portion 158 has a diameter slightly larger than the diameter of the free ring 36 so that the rings will fit easily into the passage 32. A member 157 may be provided so that teeth thereon will interfit with teeth on member 156 to permit axial adjustment of the entrance to the passage. The tapered portion 160 tapers radially so as to progressively compress the unground rings radially inwardly as they pass therethrough to the diameter of the smaller portion 162. The lower portion of the passage 32 has a similar hollow piece 164 with a radially outwardly tapering portion 166 for permitting the compressed ground rings to expand back to their free shape as they leave the passage 32.

The intermediate portion of the passage includes a plurality of rollers 170 which are disposed in a circle so that the periphery thereof forms a cylinder having a diameter equal to the diameter of the cylindrical portion 162. These rollers 170 are mounted in ball bearings 172 and 174 so that the ends thereof may have gears 176 secured thereto. These gears 176 mesh with gears 178 so that the rollers 170 will always rotate together. The gears 176 and 178 are driven by a pair of gears 180 and 182, Figure 2, that are disposed on opposite sides of the passage 32. These gears 180 and 182 are mounted on the ends of the shafts 184 driven from the gears 186 on the ends of shafts 188 and 190. The shafts 188 and 190 are driven from gear 80 in the middle of the shaft 78. As the rings in the stack 38 have their gaps 50 aligned originally, as they commence to rotate in the intermediate portion of the passage 32, the gaps 50 will always be out of alignment.

The grinding wheel 22 on the grinding unit 16 may project between a pair of adjacent rollers 170 so as to engage the periphery of the rings being rotated by the rollers 170. It is preferable that the axis of the grinding wheel 22 be normal to the axis of the stack 38 so that the surfaces will be abraded in a direction substantially normal to the plane thereof. It can thus be seen that as the feed mechanism 34 feeds the stack 38 downwardly at a uniform rate through the intermediate portion of the passage 32, the rings will be rotated so as to engage the grinding wheel 22 which will grind spirally around the peripheral surface of the rings as they expand against the inside of the rollers 170. As the periphery of the rings are ground off and the rings expand against the rollers 170, they will acquire a true cylindrical surface. It is apparent that the stack 38 of rings will be fed axially through the rollers 170 at a uniform rate and that the rollers 170 will simultaneously rotate the rings at a uniform rate. Thus since the grinding wheel 22 is disposed in a plane normal to the plane of the rings, the wheel 22 will grind a substantially helical or spiral groove 199 on the working surface of the ring with the abrasion marks 201 being disposed parallel to the axis of the ring. After the grinding operation the rings will pass through member 164 and expand to their free size and drop from the passage 32. From here the ground rings may be given any finishing operations desired.

Various changes and modifications of the embodiment of the invention described herein may be made by those skilled in the art without departing from the spirit and principles of the invention.

What is claimed is:

1. A process for forming a split resilient packing ring which comprises compressing a ring radially inwardly in the plane thereof, continuously moving said compressed ring axially in one direction along the axis of the ring at a substantially uniform velocity, rotating said ring about said axis while continuing said axial movement of said ring, abrading the peripheral surface of said ring in a direction normal to the plane thereof while continuing said axial and rotary movement of said compressed ring.

2. A process of forming split resilient packing rings which comprises continuously moving a substantially cylindrical stack of radially inwardly compressed rings in an axial direction at a substantially uniform velocity, rotating said stack of rings about said axis while continuing said axial movement of said stack, individually abrading the peripheral surface of the rings in said stack in a direction normal to the planes of said rings during said axial and rotary movement of said stack.

3. A process of forming split resilient packing rings which comprises forming a substantially cylindrical stack of resilient packing rings, continuously moving said stack in an axial direction at a substantially uniform velocity, progressively compressing the individual rings in said stack radially inwardly during the initial part of such axial movement, rotating a part of said stack containing said compressed rings about said axis during an intermediate part of such uniform axial movement, individually abrading the peripheral surface of each of said compressed rings in said part of said stack in a direction parallel to said axis, and thereafter progressively expanding said rings in said stack during a final part of such movement.

4. In an apparatus having a passage therethrough and a magazine offset from said passage, the combination of a cross feed having an advancing stroke from said magazine toward said passage, and a pair of members disposed outside of said passage and adjacent one end thereof for movement axially of said passage, first drive means connected to one of said members for moving that member toward said passage at a substantially uniform velocity during the beginning and ending portions of said advancing stroke, second drive means connected to the other of said members for moving that member toward said passage at said substantially uniform velocity during the intermediate portion of said advancing stroke.

5. In an apparatus having a magazine for holding a plurality of work pieces and a passage for positioning a stack of said work pieces, the combination of a cross feed having an advancing stroke for moving at least one of said work pieces from said magazine towards one end of said passage, a pair of members disposed outside of said passage for movement toward said passage, first drive means connected to one of said members for driving that member against the work piece forming the end of said stack during the beginning and ending portions of said advancing stroke, second drive means connected to the other of said members for driving that member against the work piece forming the end of said stack during the intermediate portion of said advancing stroke.

6. In an apparatus for grinding split rings, a magazine for holding a plurality of split rings, a passage for retaining a stack of said rings in position during the grinding thereof, said passage and said magazine being substantially parallel to each other, a reciprocable cross feed having an advancing stroke for moving at least one ring from said magazine towards one end of said passage, a pair of members disposed for reciprocating movement in substantial axial alignment with said passage, one of said members having means thereon for engaging the end ring in said stack only along the portions of said ring closest to and farthest from said cross feed during the intermediate portions of said advancing stroke, the other of said members having means thereon for engaging said end ring in said stack only along the intermediate portions of said ring during the beginning and ending portions of said advancing stroke.

7. In an apparatus for grinding split rings, a magazine for holding a plurality of split rings, a passage for retaining a stack of said rings in position during grinding thereof, said passage and said magazine being parallel and laterally offset from each other, a reciprocable cross feed having an advancing stroke for moving at least the end ring from said magazine towards one end of said passage, a pair of members disposed for reciprocating movement in substantial axial alignment with said passage, one of said members having fingers thereon for intermittently engaging the end ring in said stack along the portions of said end ring closest to said cross feed and farthest from said cross feed, the other of said members having rollers thereon for engaging said end ring along the intermediate portions of said end ring, cam means positioned to engage said members for urging said fingers against said end ring and moving said stack axially at a substantially uniform velocity during the intermediate portion of said advancing stroke and also being positioned for urging said rollers against said end ring and moving said stack axially at a substantially uniform velocity during the beginning and ending portions of said advancing stroke.

8. In an apparatus for grinding split piston rings, a substantially vertical magazine for holding a plurality of split piston rings, a substantially vertical passage for retaining a stack of said rings in position during the grinding thereof, the lower end of said magazine being disposed in substantially the same plane as the upper end of said passage, a reciprocable cross feed having an advancing stroke for moving at least the bottom ring from said magazine to the upper end of said magazine, a pair of concentric members disposed in a vertical position above said passage for reciprocating movement in substantial axial alignment with said passage, one of said members having fingers on the lower end thereof for engaging the uppermost ring in said stack along the portions thereof closest to and farthest from said cross feed, the other of said members having rollers on the lower end thereof for engaging the uppermost ring in said stack along the intermediate portions of said ring, and cam means positioned to engage the upper end of one of said members for urging said fingers downwardly against said uppermost ring and moving said stack axially through said passage at a substantially uniform velocity during the intermediate portion of said advancing stroke, and second cam means positioned to engage the upper end of said other member for urging said rollers downwardly against said uppermost ring and moving said stack axially through said passage at a substantially uniform velocity during the beginning and ending portions of said advancing stroke.

9. In an apparatus having a passage therethrough for positioning a stack of piston rings during a grinding operation, a feed mechanism for continuously moving said stack of piston rings axially through said passage at a substantially uniform velocity, means for simultaneously rotating the rings in the intermediate portion of said stack during said axial movement, and means for individually abrading the peripheral surface of the rings in said intermediate portion of said stack in a direction parallel to said axis during said axial and rotational movement.

10. In an apparatus for forming split piston rings, a passage for positioning a stack of piston rings during a grinding operation, a feed mechanism for continuously moving the rings in said stack axially through said passage at a substantially uniform velocity, said passage having an end portion tapering inwardly for progressively compressing said rings radially inwardly during said movement, means for rotating the rings in the intermediate portion of said stack during said axial movement, means for individually abrading the peripheral surface of said rings in said intermediate portion in a direction substantially parallel to said axis during said rotary and axial movement, and an end portion of said passage tapering outwardly to progressively expand said rings.

11. In an apparatus for forming split piston rings, a magazine for holding unground piston rings, a substantially cylindrical passage for positioning the rings in a stack of piston rings during a grinding operation, a feed mechanism for transferring rings from said magazine to said stack in said passage and continuously moving the rings in said stack axially through said passage at a substantially uniform velocity, said passage having a first end portion tapering inwardly for progressively compressing said rings in said stack radially inwardly during said axial movement and a second end portion tapering outwardly for progressively expanding said rings in said stack radially outwardly during said axial movement, means disposed in said passage between said end portions for rotating said compressed rings in said stack during said uniform axial movement, and a grinding wheel rotatable in a plane parallel to said axis and being positioned to abrade the peripheral surface of said moving rings.

12. In an apparatus for forming split piston rings, a magazine for holding unground piston rings, a substantially cylindrical passage for positioning the rings in a stack of piston rings during a grinding operation, a feed mechanism for transferring rings from said magazine to said stack in said passage and continuously moving the rings in said stack axially through said passage at a substantially uniform velocity, said passage having a first end portion tapering inwardly for progressively compressing said rings in said stack radially inwardly during said axial movement and a second end portion tapering outwardly for progressively expanding said rings in said stack radially outwardly during said uniform axial movement, a plurality of rollers disposed in a circle to form the intermediate portion of said passage between said tapered ends for rotating said rings during said uniform axial movement, and a grinding wheel rotatable in a plane parallel to said axis and being positioned to individually abrade the peripheral surface of said moving rings.

13. In an apparatus for forming split piston rings, a substantially vertical magazine for holding unground piston rings, a substantially vertical passage for positioning the rings in a stack of piston rings during a grinding operation, a horizontal feed mechanism for transferring rings from the bottom of said magazine to the upper end of said stack in said passage, vertical feed means for accepting said transferred rings and continuously moving the rings in said stack axially through said passage at a substantially uniform velocity, said passage having tapered end portions for progressively radially inwardly compressing said rings during the initial stage of said movement and progressively expanding said rings during the final stage of said movement, a plurality of driven rollers disposed between said end portions, said rollers being positioned in a circle for rotating said rings during axial movement of said stack through said passage, a grinding wheel rotatable in a plane parallel to said axis and being positioned to abrade the peripheral surface of said rotating rings in a direction normal to the plane thereof.

14. A piston ring for use on a piston reciprocably disposed in a cylinder, said piston ring comprising a substantially cylindrical member having an axially extending slot between the opposite ends thereof, said member having a radially outwardly disposed surface that forms a a substantially cylindrical working surface adapted for slidably engaging the walls of said cylinder, said working surface including a shallow helical groove extending circumferentially around the ring to form a plurality of axially spaced turns, said groove having parallel abrasion marks running transversely of the groove and continuously throughout the length thereof.

References Cited in the file of this patent

UNITED STATES PATENTS

| | | |
|---|---|---|
| 1,041,787 | Henry | Oct. 22, 1912 |
| 1,814,363 | Booth | July 14, 1931 |
| 2,377,960 | Phillips | June 12, 1945 |
| 2,521,209 | Fether | Sept. 5, 1950 |
| 2,566,304 | Bates | Sept. 4, 1951 |
| 2,654,977 | Squibb | Oct. 13, 1953 |